United States Patent [19]

Chandler

[11] Patent Number: 5,419,719

[45] Date of Patent: May 30, 1995

[54] INTEGRALLY FUSED ELECTRICAL PLUG

[75] Inventor: Bill B. Chandler, Colorado Springs, Colo.

[73] Assignee: Electro-Mech Co., Colorado Springs, Colo.

[21] Appl. No.: 188,151

[22] Filed: Jan. 27, 1994

[51] Int. Cl.⁶ .............................................. H01R 13/68
[52] U.S. Cl. ..................................................... 439/622
[58] Field of Search ............... 439/621, 622, 638, 692, 439/682

[56] References Cited

U.S. PATENT DOCUMENTS 4,846,733 7/1989 Baisz et al. ........................... 439/622
4,927,366 5/1990 Tommerson et al. ............... 439/622

FOREIGN PATENT DOCUMENTS 74065 3/1991 Japan ................................... 439/622

Primary Examiner—Gary F. Paumen
Attorney, Agent, or Firm—Richard W. Hanes

[57] ABSTRACT

A fused electrical plug for connecting and protecting an electrical cord having at least a pair of electrical conductors, where the plug has a body member with an integral fuse carrying cavity and mounting at least two electrical terminals for interconnection with mating terminals in another plug, a pair of electrical terminal lugs communicating with said fuse cavity, and further comprising a selectively removable electrical fuse having a pair of fuse terminals, where the fuse is normally disposed within the cavity and the fuse terminals interconnect with the said electrical terminal lugs.

1 Claim, 1 Drawing Sheet

INTEGRALLY FUSED ELECTRICAL PLUG

The present invention relates generally to electrical apparatus and more particularly to an integrally fused plug attachable to a cable which interconnects an electrical battery and a battery recharging device.

BACKGROUND

The use of electrical batteries and affiliated battery chargers for appliances, machines and electrically powered toys is increasing significantly as battery efficiency and power output continues to be enhanced. Many of the batteries in use in such apparatus have significantly high ampere/hour capability with fully charged short circuit current capacity of up to 100 amperes. Even a run down 12 volt lead/acid type battery, having only 10 volts of output is capable of producing 30 amperes of short circuit current.

Recharging apparatus for such batteries typically includes the combination of a voltage reduction transformer and a rectifier, which plugs into a 110 volt a.c. outlet. Typically, an ordinary home appliance light duty electrical cord interconnects the battery recharger and the battery or battery set which is to be recharged. In some instances the batteries themselves are fused but the fuse ratings are set to accommodate typical operational current flows which most often exceed by a wide margin the normal level of approximately 1-2 amperes of recharging current. Accordingly, the battery fuse is of little use in protecting against current flows which may not disrupt the high current battery fuse but which would be in excess of that tolerable by the light duty electrical cord which interconnects the battery pack and the recharger device.

It is highly important that this recharger-battery circuit be protected from excessive currents since the electrical cord interconnecting the battery pack and the recharger is very susceptible to damage which may include a short circuit. It has been demonstrated that a short circuit in a four foot length of household electrical cord which is connected to a lead/acid 12 volt battery pack which has been run down to 10 volts can produce sufficient electrical current in the cord to cause it to become white hot in a short period of time. Obviously, an accidental circumstance of this kind where the battery recharging operation had been left unattended or where, if attended, the apparatus could not be mined off time, represents a serious fire hazard.

In order to block the electrical discharge of the battery or battery pack into the conductors which interconnect the recharging device and the battery it is mandatory to fuse the electrical cord itself. That can best be accomplished by providing a fusing system in the plug to which the conductors in the cord are connected.

Accordingly, it is the primary object of the present invention to provide an electrical conductor fusing system that will prevent a high current discharge of a battery into the conductors attached to the battery in the event that the conductors become shorted or interconnected with a low resistance connection.

Another object of the invention is to provide a fusing system for electrical cords where the fuse is carded by the electrical plug attached to one end of the conductors comprising the electrical cord.

A further object of the invention is to reduce the fire hazard potential of a damaged electrical cord.

A preferred form and an alternative form of the invention are illustrated in the accompanying drawings in which.

DETAILED DESCRIPTION

Figure 1:
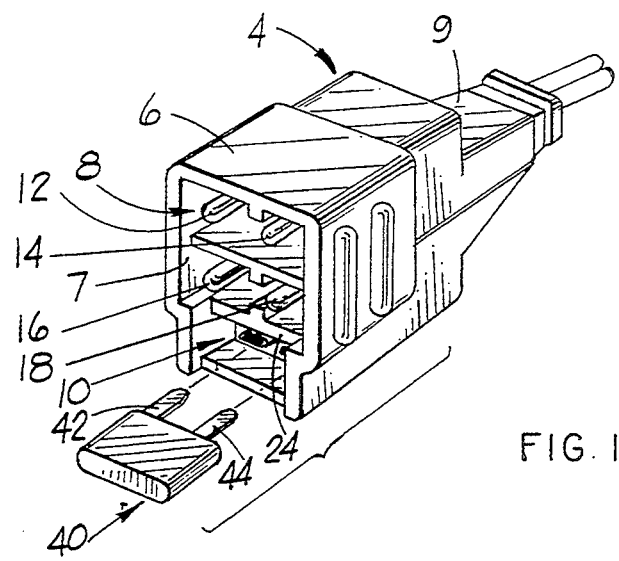
FIG. 1 is a perspective view of a four terminal plug of the present invention, adapted to connect to a four terminal connector, which interconnects two batteries in series. A perspective view of a fuse which is insertable in the plug is also shown.
Figure 2:
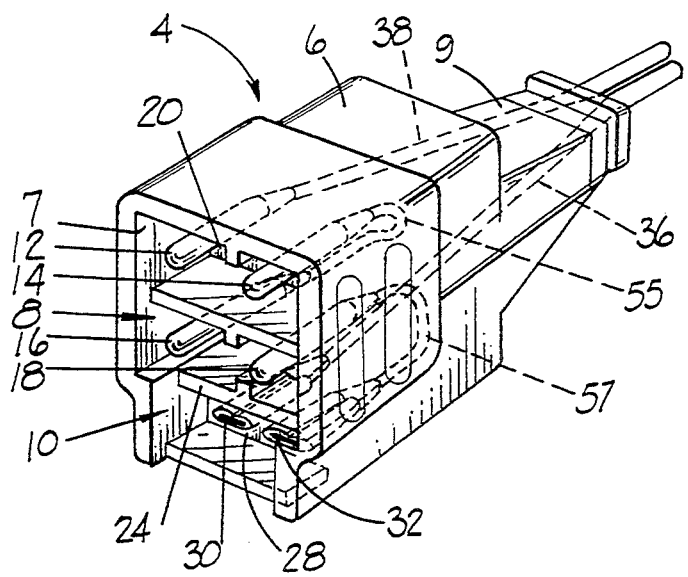
FIG. 2 is an enlarged perspective view, similar to that of FIG. 1, but showing the internal connections and construction of the fused plug.

Referring first to the embodiment shown in FIG. 2, a four terminal plug according to the present invention is designated generally by reference numeral 4. A substantially rectangularly shaped tubular housing 6 having an open end 7 and a closed end 9 is subdivided into two parts, a terminal compartment 8 and a fuse compartment 10. Four terminal prongs 12, 14, 16 and 18 are carried and supported by a vertical partition 20 disposed across the cross section of the housing 6 and recessed from the open end 7 of the plug 4 a distance which is equal to the length of the prongs.

Underneath a horizontal partition 24 which divides the housing into the upper and lower compartments 8 and 10 respectively is a second vertical partition 28 which carries and supports a pair of horizontally spaced apart lugs 30 and 32. The partition 28 is set back from the open end 7 of the plug housing 6 a distance sufficient to define a space which will accommodate a spade connector type of "mini" auto fuse 40. The spade connectors 42 and 44 of the fuse are insertable into the lugs 30 and 32 to make the electrical connection into the circuit, as shown in FIG. 3.

Figure 3:
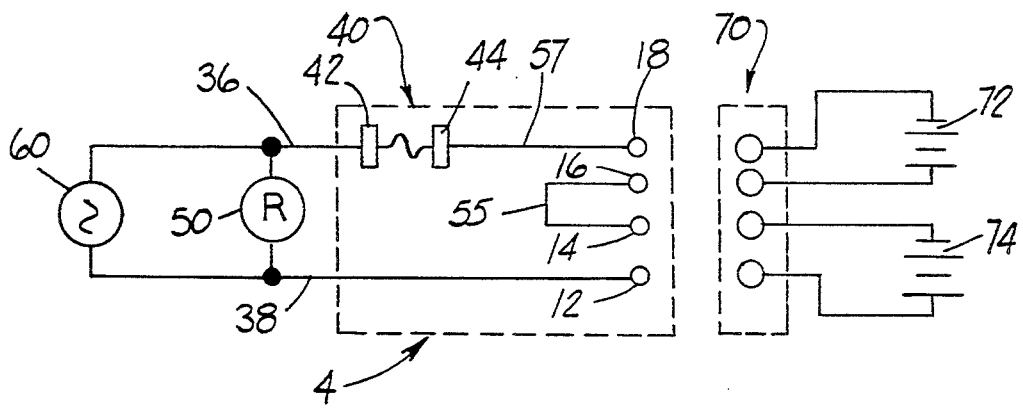
FIG. 3 is a circuit diagram of the plug shown in FIG. 2 as it would typically be connected to two six volt batteries and a recharging device.

On the closed end side of the partition 20 the prongs 12-18 and the lugs 30 and 32 are connected to each other and to electrical conductors 36 and 38 which enter the plug 4 through a small opening in the closed end 9 of the plug housing 6, as shown in the circuit diagram of FIG. 3. The electrical conductors 36 and 38 ordinarily comprise an ordinary light duty household type of electrical cord which interconnects the plug 4 and a battery recharger unit 50. The recharger unit takes its power from a standard 110 volt a.c. outlet 60.

As seen diagrammatically in FIG. 3, the plug 4 is intended to interconnect with a plug 70 which is normally attached to the batteries 72 and 74 which are to be recharged. A jumper cable 55 interiorly of the plug 4 acts to connect the batteries in series by interconnecting plug terminals 14 and 16. A connector 57 interiorly of the plug 4 connects the terminal 18 to one of the lugs 32 of the fuse connector while the terminal 12 of the plug 4 connects directly to one of the conductors 38 of the electrical cord which conveys d.c. current from the recharging device 50 to the batteries 72 and 74.

In the event that the conductors 36 and 38 of the electrical cord become shorted or interconnected with a low resistance so as to tend to draw high currents from the batteries 72 and 74, the fuse 40 will protect the circuit by blowing, in response to current flows in excess of 3 amperes for example. Thus, the cord containing the conductors 36 and 38 will be protected from overheating and creating a fire hazard.

I claim:

1. An electrical male connector plug, comprising,
a body having an open interior and having sides, a rear portion including an aperture therein and a front face having at least one recess into the interior of the body,
four mutually parallel and spaced apart male terminal posts mounted within the recess,
a second recess in the body and extending into the interior thereof,
a pair of female electrical socket members carried by the body and disposed so as to be open to said second recess,
a first electrical connection within the interior of the body interconnecting one of the female electrical socket members with one of the said terminal posts, and
second electrical connection within the interior of the body interconnecting two of said four male terminal posts.

* * * * *